April 27, 1954
P. C. SYMMONS
2,676,615
DUPLEX VALVE
Filed Feb. 18, 1952
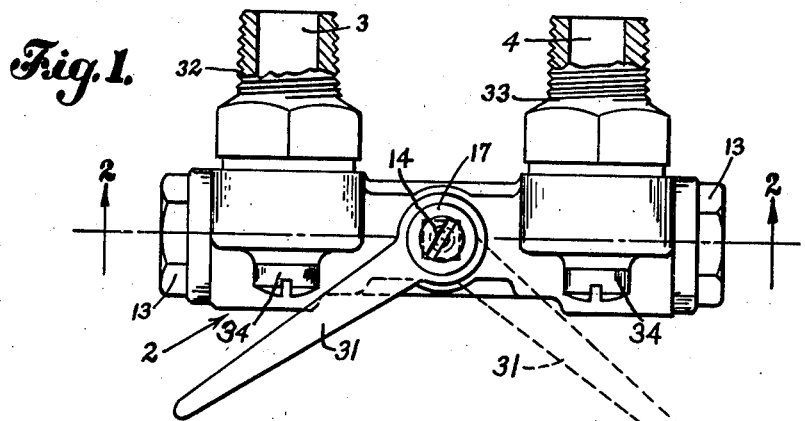
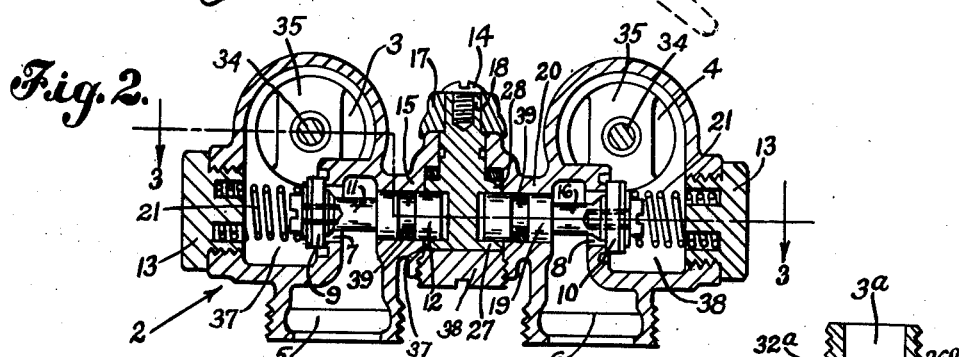
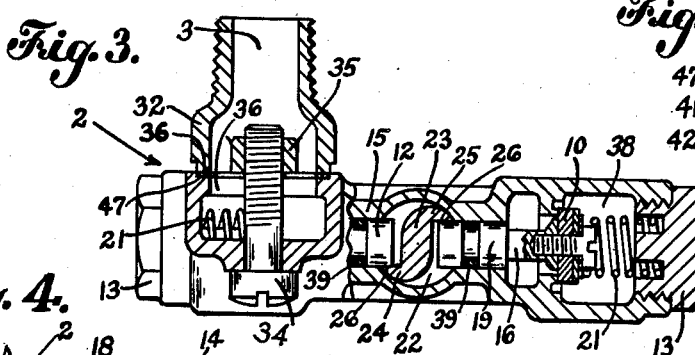
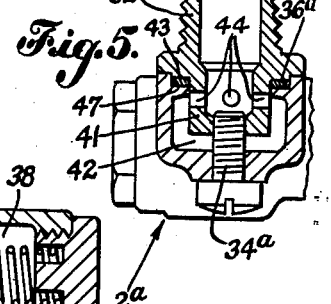
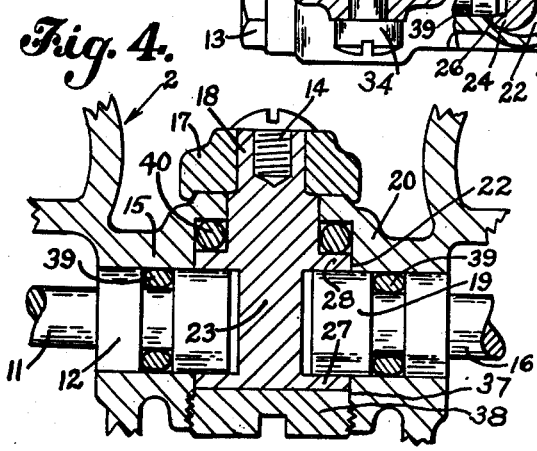
INVENTOR.
Paul C. Symmons.
BY Louis C. Smith
Attorney.

Patented Apr. 27, 1954

2,676,615

UNITED STATES PATENT OFFICE 2,676,615

DUPLEX VALVE

Paul C. Symmons, West Roxbury, Mass.

Application February 18, 1952, Serial No. 272,100

2 Claims. (Cl. 137—595)

This invention relates to a duplex valve of the type which has two valve units, each of which has its individual inlet, and its individual valve member controlling the flow from the inlet, and which also has a valve operating member common to both valve members for opening and closing the valve.

An object of the invention is to provide a valve of this type in which each valve unit has its separate outlet, the valves are self-closing and which is so constructed that when the valve-operating member is actuated both valves will be simultaneously opened to the same extent.

Another object of the invention is to provide a valve of this type which is simple in construction and inexpensive to manufacture.

In the drawings:

Fig. 1 is a plan view of a valve device embodying my invention.

Fig. 2 is a section on line 2—2, Fig. 1.

Fig. 3 is a section on line 3—3, Fig. 2.

Fig. 4 is a fragmentary sectional view on an enlarged scale.

Fig. 5 is a sectional view showing a different form of the invention.

The device comprises a valve casing 2 having two separate inlets 3 and 4, and two separate outlets 5 and 6. The inlet 3 leads into a valve chamber 37 which is connected to the outlet 5 by means of a port 7, and the inlet 4 leads into a separate valve chamber 38 which is connected to the outlet 6 by a similar port 8. The port 7 is controlled by an automatically closing valve 9 located in the valve chamber 37 and the port 8 is controlled by a similar valve 10 located in the valve chamber 38.

The valve 9 is carried by a stem 11, having an end portion 12 which is slidingly supported in a bearing portion 15 of the valve casing.

The valve 10 is carried by a similar stem 16, the inner end portion 19 of which is slidingly supported in a bearing in the portion 20 of the valve casing 2.

Each valve is acted on by a spring 21 which yieldingly holds it closed, each spring being backed at its outer end by a removable plug 13 which is screw-threaded into the end of the valve casing. The two valves are oppositely disposed, the valve 9 opening toward the left and the valve 10 opening toward the right.

The two valve stems 11 and 16 are axially alined and inner ends 12 and 19 project into a cylindrical chamber 22 with which the valve casing 2 is provided and in which is located a turnable cam member 23 adapted, when turned counterclockwise in Fig. 3, to act simultaneously against both valve stems thereby moving them away from each other and simultaneously opening both valves.

The cam member 23 is formed with two oppositely disposed cam portions 24 and 25, which, when the cam is turned counterclockwise, act against the inner ends 12 and 19 of the valve stems 11 and 16 thereby opening the valves. These cam portions are so shaped that as the cam is turned they not only open the valves simultaneously, but to the same extent.

Each cam portion 24, 25, is undercut as shown at 26, thereby forming shoulders which cooperate with the inner ends 12 and 19 of the valve stems to limit backward turning movement of the cam, as shown in Fig. 3.

Said cam member is shown as having two flanges 27, 28, which are of a size to fit the walls of the chamber 22 and between which the ends 12 and 19 of the valve stems are received. Said valve stem ends thus cooperate with the flanges to assist in retaining the cam member in position. The upper end of the cam member has a flat sided projection 18 which fits into a recess formed in the hub portion 17 of a handle 31 by which the cam member is manipulated, said handle being retained on the projection 18 by a screw 14.

The valve casing is made with an opening 41 directly beneath the cam member 23 and through which it can be entered into the chamber 22 or withdrawn therefrom. This opening is normally closed by a screw-threaded plug 48.

The inner end portions 12 and 19 of the valve stems 11 and 16 are provided with grooves to receive packing 39 which prevents leakage of water into the chamber 22. The upper end of the cam member is also provided with suitable packing 40.

In order to simplify the construction and installation of the device, the two inlets 3 and 4 are formed in separate fittings which are separable from the body of the valve casing. In Figs. 1, 2, and 3 these separate fittings are indicated at 32 and 33 and the inner end of each fitting seats against an annular seat 47 formed on the rear side of the valve casing and surrounding an opening in the rear wall thereof with which the fitting registers. Each fitting is secured to the valve casing by an attaching bolt which passes through the valve casing from the front and is screw-threaded into a bridge member 35 with which the fitting is provided. A packing element 36 between the end of each fitting and the seat 47 of the valve casing serves to make a tight joint.

Another way of attaching the inlet and outlet fittings to the valve casing is shown in Fig. 5 in which 2a indicates a portion of the valve casing and 32a is one of the inlet fittings. Said fitting is formed with a hollow nose portion 41 of reduced diameter which is located within the chamber 42 of the valve casing, said nose portion forming with the body of the fitting a forwardly facing shoulder 43. The fitting is secured to the valve casing by a screw or bolt 34a which passes through the wall of the valve casing and screws into the end of the nose portion 41, thereby clamping the shoulder 43 against the seat 47 of the valve casing. A packing ring 36a makes a tight joint between the shoulder and said seat. The hollow nose portion has ports 44 through which water flows from the inlet into the chamber 42 and thence into the valve chamber.

In the construction shown in Figs. 2 and 3, the end of the fitting may be regarded as a forwardly facing shoulder which is held to the seat 47 by the attaching screw.

I claim:

1. A valve comprising a valve casing having two separate inlets, a separate outlet for each inlet, and a separate port connecting each inlet with its outlet, a spring-pressed valve member normally closing each port, said valve members being oppositely disposed and in axial alinement, the central portion of the valve casing having a cam-receiving chamber provided with two oppositely disposed openings, each valve member having a stem projecting therefrom toward and in alinement with the stem of the other valve member, said stems extending through the openings in the valve-receiving chamber and projecting slightly into said chamber, a cam member mounted in said chamber for turning movement and situated between the adjacent ends of said stems, said cam member having two similar oppositely disposed cam portions adapted to engage the two stems as the cam member is turned in one directiton thereby to open the valve members simultaneously, said cam member having a stop shoulder to engage the inner end of one of the stems as said cam member is turned into valve-closing position, thereby limiting the backward movement thereof.

2. A valve as defined in claim 1 in which the cam portion of the cam operating against either stem has a stop shoulder to engage the end of the other stem as the cam is turned into valve-closing position, thereby limiting the backward movement thereof.

References Cited in the file of this patent

UNITED STATES PATENTS

| Number | Name | Date |
|---|---|---|
| 721,595 | Moran | Feb. 24, 1903 |
| 868,322 | Blum | Oct. 15, 1907 |
| 951,161 | Watrous | Mar. 8, 1910 |
| 1,345,772 | Hibner | July 6, 1920 |
| 2,075,600 | Baker | Mar. 30, 1937 |
| 2,268,408 | Krone | Dec. 30, 1941 |
| 2,554,514 | Wright et al. | May 29, 1951 |
| 2,616,710 | Woodruf | Nov. 4, 1952 |